(12) United States Patent
Saillard

(10) Patent No.: US 8,291,652 B2
(45) Date of Patent: Oct. 23, 2012

(54) DEVICE FOR HOLDING PHOTOVOLTAIC PANELS ON A ROOF, INCLUDING HOLDING MEANS ALLOWING AN AIR FLOW BETWEEN A BASE PLANE AND THE PHOTOVOLTAIC PANEL

(76) Inventor: Guy Saillard, Crach (FR)

( * ) Notice: Subject to any disclaimer, the term of this patent is extended or adjusted under 35 U.S.C. 154(b) by 180 days.

(21) Appl. No.: 12/680,149

(22) PCT Filed: Oct. 1, 2008

(86) PCT No.: PCT/EP2008/063192
§ 371 (c)(1),
(2), (4) Date: Jul. 16, 2010

(87) PCT Pub. No.: WO2009/043894
PCT Pub. Date: Apr. 9, 2009

(65) Prior Publication Data
US 2010/0281794 A1   Nov. 11, 2010

(30) Foreign Application Priority Data

Oct. 2, 2007   (FR) ..................... 07 06887

(51) Int. Cl.
*E04D 13/18* (2006.01)
*E04H 14/00* (2006.01)

(52) U.S. Cl. ............... 52/173.3; 52/302.3; 52/475.1; 52/762; 248/346.5

(58) Field of Classification Search .......... 52/173.3, 52/302.3, 475.1, 762, 777, 779, 506.05; 248/346.5, 248/309.1, 237, 300
See application file for complete search history.

(56) References Cited

U.S. PATENT DOCUMENTS

| 5,596,847 | A * | 1/1997 | Stephenson | 52/198 |
| 5,768,831 | A * | 6/1998 | Melchior | 52/173.3 |
| 6,119,415 | A | 9/2000 | Rinklake et al. | |
| 6,201,179 | B1 | 3/2001 | Dalacu | |
| 6,365,824 | B1* | 4/2002 | Nakazima et al. | 136/251 |
| 6,453,629 | B1* | 9/2002 | Nakazima et al. | 52/173.3 |
| 2003/0154680 | A1 | 8/2003 | Dinwoodie | |
| 2005/0161074 | A1* | 7/2005 | Garvison et al. | 136/246 |
| 2005/0166955 | A1* | 8/2005 | Nath et al. | 136/251 |
| 2008/0289272 | A1* | 11/2008 | Flaherty et al. | 52/173.3 |

FOREIGN PATENT DOCUMENTS

| DE | 20104774 | 8/2001 |
| DE | 20 2006 012 708 U1 | 12/2006 |
| EP | 1 020 929 A1 | 7/2000 |
| EP | 1 071 137 A1 | 1/2001 |
| JP | 2002-115372 | 4/2002 |

* cited by examiner

*Primary Examiner* — Brian Glessner
*Assistant Examiner* — Brian D Mattei
(74) *Attorney, Agent, or Firm* — Patterson Thuente Christensen Pedersen, P.A.

(57) ABSTRACT

The invention relates to a device for holding at least one photovoltaic panel on a roof, characterised in that it comprises: a base plane extending between two fixation wings; holding means for said photovoltaic panel(s) extending vertically relative to said base plane in order to define an air volume between said base plane and said photovoltaic panel (s), said holding means including air inlet/outlet means that permit air circulation in said air volume.

17 Claims, 2 Drawing Sheets

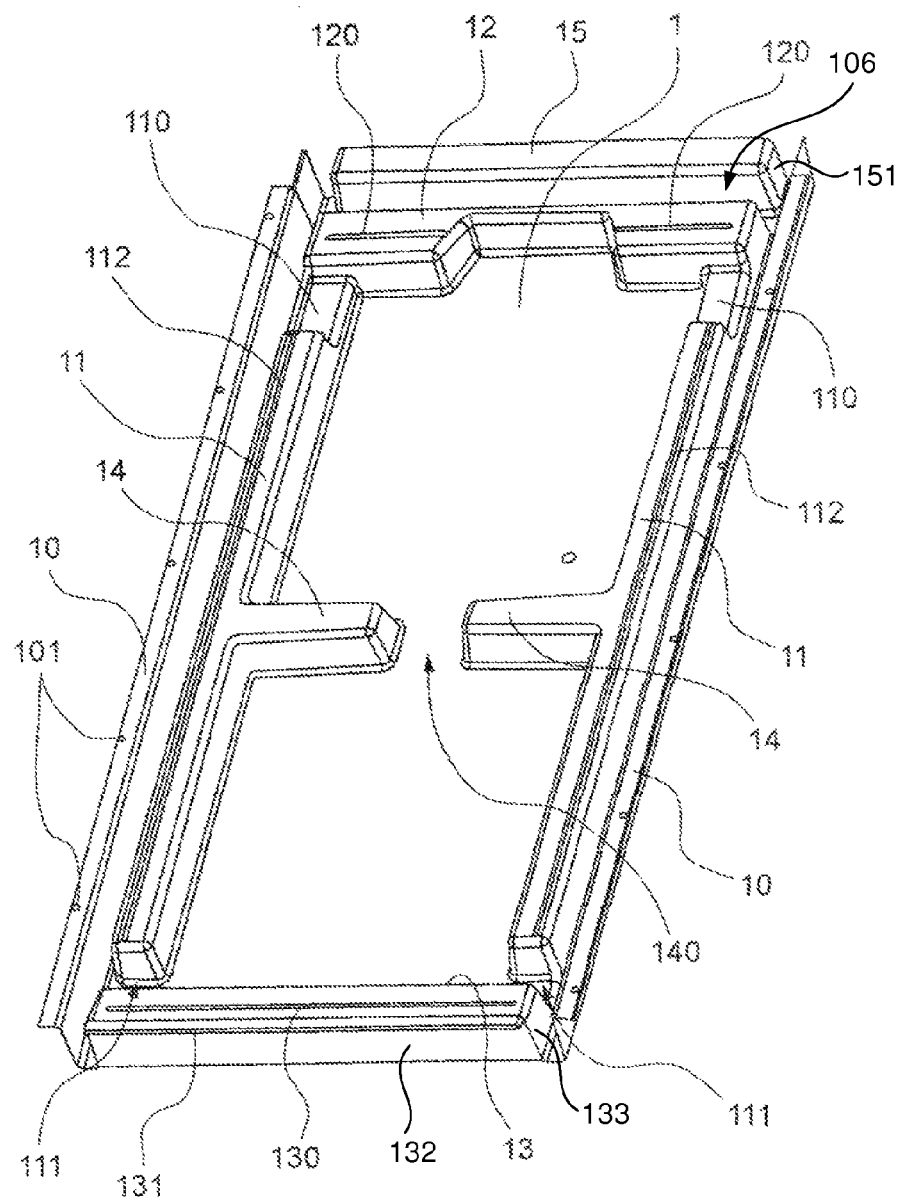
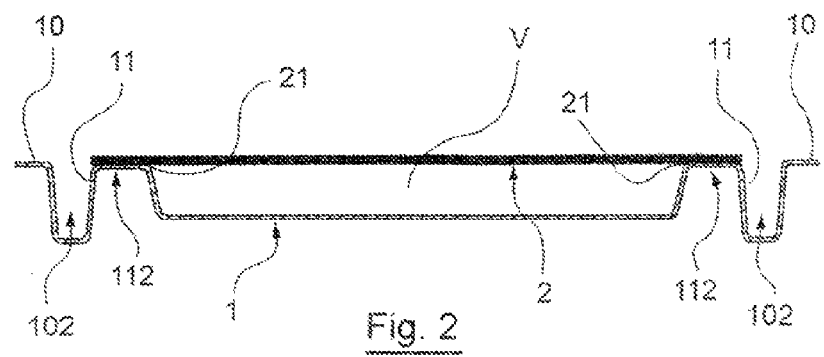
Fig. 1
Fig. 2

DEVICE FOR HOLDING PHOTOVOLTAIC PANELS ON A ROOF, INCLUDING HOLDING MEANS ALLOWING AN AIR FLOW BETWEEN A BASE PLANE AND THE PHOTOVOLTAIC PANEL

PRIORITY CLAIM

The present application is a National Phase entry of PCT Application No. PCT/EP2008/063192, filed Oct. 1, 2008, which claims priority from French Application No. 0706887, filed Oct. 2, 2007, the disclosures of which are hereby incorporated by reference herein in their entirety.

TECHNICAL FIELD

The present invention relates to techniques of installing solar panels on roofs. More precisely, the invention concerns a device for mounting one or more photovoltaic panels on a roof, whether it be integrated in the roof or attached to an existing roof. The invention also relates to an assembly comprising a support device equipped with a photovoltaic panel, and a roof comprising at least such an assembly.

BACKGROUND ART

Installation of photovoltaic panels, has been on the rise.

There are two types of installation of photovoltaic panels on a roof:
 photovoltaic panels to be laid superimposed on a roof;
 photovoltaic panels fixed to roof surfaces instead of the normal roof material, or in combination therewith.

When the panels are intended to be placed superimposed on a roof, they are generally mounted in a frame, for example made from aluminium, the latter being intended to be fixed to the roof in various ways, such as:
 shoes for a corrugated iron roof;
 bolts for fixing to metal rings;
 clips for fixing to a zinc roof;
 hooks for fixing to roof tiles;
 other known attachment systems.

For panels intended to be fixed in place of normal roof material, the panels are also mounted in a frame, the latter being intended to be mounted directly on the roof timbers, for example by means of rails. In this case, mounting the panel involves using a relatively large amount of hardware, such as fixing shoes, rails, flashing, beads, gaskets, fillets, edge strips, and a whole range of associated screws.

It will be appreciated that mounting photovoltaic panels on a roof involves the use of numerous fixing parts, and requires recourse to specialized trades.

In addition, conventional techniques associate the panels with a metal frame, composed of profiles. However, producing such frames proves relatively expensive, all the more so since it is often necessary to provide different profiles according to the dimensions and/or design of the photovoltaic panels.

Moreover, the assembly formed by the photovoltaic panel and the metal frame has considerable weight, which tends to be detrimental to the ease of handling the assembly, in particular during operations of mounting on the roof. As specified previously, in the present description, the expression "photovoltaic panel" designates the panel as such, without the frame. A photovoltaic panel conventionally includes a film of photovoltaic cells between two support plates, for example made from glass.

Moreover, current techniques usually neglect an important parameter having impact on the optimised functioning and long life of the photovoltaic panels, with regard to the heating of the cells that make them up. This is because excessive heating of the panel gives rise to a risk of damage to this photovoltaic cells and/or a reduction in the efficiency thereof. However, by nature, these panels are exposed to sunshine liable to generate strong heat at the roofs on which the photovoltaic panels are mounted.

SUMMARY OF THE INVENTION

The objective of the invention is in particular to overcome these drawbacks of the prior art.

More precisely, the objective of the invention is to propose a technique for fixing photovoltaic panels on roofs, which is easy and rapid and ensures a long life for the photovoltaic panels.

In this regard, the objective of the invention is to provide such a technique that prevents, or at least limits, the risk of damage to the cells of the photovoltaic panels due to excessive heating.

Another objective of the invention is to provide such a technique that makes it possible to envisage a reduction in the number of hardware parts used for fixing the panels to a roof.

Another objective of the invention is to provide an assembly for mounting a photovoltaic panel having reduced weight compared with the assemblies of the prior art.

Another objective of the invention is to provide such an assembly that is inexpensive to produce.

Yet another objective of the invention is to provide such a technique that makes it possible, on the basis of the same principle, to attach panels to existing roofs or to integrate them instead of current roof materials.

Another objective of the invention is to provide such a technique that is simple in design and easy to implement.

These objectives, as well as others that will emerge subsequently, are achieved by virtue of the invention, the subject matter of which is a support device for supporting at least one photovoltaic panel on a roof, includes:
 a base surface extending between two fixing wings;
 support means for supporting said photovoltaic panel or panels extending in elevation with respect to said base surface so as to provide a volume of air between said base surface and said photovoltaic panel or panels, said support means having air inlet/outlet means enabling air to circulate in said volume of air.

Thus the invention proposed is a novel approach for mounting photovoltaic panels on a roof, distinguished in particular from the assemblies proposed in the prior art according to which the panels are integrated in a metal frame. In this way, and as will emerge more clearly hereinafter, the photovoltaic panels can be assembled on their support simply and easily, while limiting in particular the manufacturing cost in comparison with the manufacturing costs of frames formed of metal profiles.

In addition, the invention makes it possible to preserve the cells making up the photovoltaic panel vis-à-vis excessive heating, by allowing a circulation of air between the panel and its support, thus providing ventilation for the panel.

Moreover, a support device according to the invention can easily be adapted for a fixing superimposed on a roof or a fixing instead of the roof materials, by modifying the design of the fixing wings.

It should be noted that the term "roof" encompasses both roofs for dwellings or buildings and so-called "roof terraces".

Advantageously, the support device is formed from a single piece produced from a composite material and encompassing at least the base surface, the wings and the support, the single piece preferentially being produced from a mixture of glass fibres and polyester resin.

In this way, the support device can be mass produced, for example by molding, which requires no assembling of the support device as such. The manufacturing cost can thus be reduced compared with the prior techniques requiring the production and assembly of profiles to form a frame.

According to an advantageous solution, the supports include:
- at least two longitudinal protrusions extending in the vicinity of the wings; and
- at least two transverse protrusions, one of which is referred to as the bottom end protrusion and the other referred to as the top end protrusion.

In this way, the longitudinal protrusions and/or the transverse protrusions define a bearing plane on which the photovoltaic panel can be fixed, for example by simple adhesive bonding.

According to an advantageous feature, the longitudinal protrusions extend as far as the top end transverse protrusion, at least one of the longitudinal protrusions having a reduction in cross section in the vicinity of the top end transverse protrusion in order to provide an air passage.

According to yet another advantageous feature, at least one of the longitudinal protrusions is at a distance from the bottom end transverse protrusion.

Thus a circulation of air is promoted between the volume extending between the photovoltaic panel and the base surface on the one hand and the outside of this volume on the other hand, through one or other or both of the passages provided at the top or bottom part of the support. Naturally the presence of two distinct passages for air promotes the circulation of air inside the volume between the photovoltaic panel and the base panel, the air external to this volume being able to circulate from one passage to the other. The separated positioning of at least one longitudinal protrusion with respect to the bottom end transverse protrusion forms an air passage at the bottom part while preserving a maximum span for assembling the photovoltaic panel on the transverse protrusion. Moreover, the air passage formed by such a separated positioning allows the flow of any water present at the base surface, in particular condensation water.

Preferentially, the supports comprise at least one intermediate transverse protrusion between bottom end and top end transverse protrusions.

Thus the photovoltaic panel (the length of which generally exceeds 1 meter) is supported rigidly and effectively over its entire length, preventing the panel from curving under the effect of its weight and/or heat.

In this case, the intermediate transverse protrusion advantageously has at least one recess forming an air passage.

The intermediate transverse protrusion thus formed does not constitute an obstacle to the circulation of air between the two parts of the volume that it separates, these two parts extending between the photovoltaic panel and the base surface.

On the contrary, it allows, or even promotes, the circulation of air between the passages formed in the vicinity of the top end transverse protrusion and the bottom end transverse protrusion.

According to an advantageous solution, the bottom end transverse protrusion has an overlap wing intended to overlap a top rim of another support device.

This feature proves particularly advantageous in an embodiment of the invention in which the assembly formed by the device and the panel are integrated in the roof instead of the normal roof materials. This is because the partial overlap of the devices with each other provides the runoff of water from one device to another (disposed one above the other), in a watertight fashion.

According to another embodiment, the support device comprises a top rim, disposed transversely above the top transverse protrusion, the bottom end transverse protrusion being able to overlap the top rim of another support device. According to an advantageous solution, the protrusions carry at least one bead extending over the length of the protrusions.

In this way, the operation of fixing the photovoltaic panels to the devices are facilitated, in particular when the photovoltaic panels are bonded to the support devices, the beads assisting the correct positioning and/or the holding of the adhesive on the device during the setting of the adhesive.

Advantageously, the wings and the longitudinal protrusions form a gutter in pairs.

The runoff of the rainwater is thus guided as far as a conventional gutter installed at the bottom edge of the roofs.

Advantageously, the top rim and the top end protrusion form a transverse gutter emerging on the two gutters formed by the fixing wings and the longitudinal protrusions.

According to yet another advantageous feature of the invention, the device comprises at least one overlap piece intended to fit on top of two adjoining wings of two devices placed alongside each other. Such an overlap piece thus fulfills a dual function:
- that of ensuring the locking of two adjacent support devices between and on the root and
- that of ensuring a seal between two adjacent support devices.

In addition, these pieces tend to improve the aesthetic appearance of all the support devices once these are installed on a roof.

Another embodiment of the invention is an assembly that comprises:
- a device supporting a photovoltaic panel, comprising a base surface extending between two fixing wings;
- means supporting a photovoltaic panel extending in elevation with respect to the base surface, and comprising at least two transverse protrusions, one referred to as the bottom end protrusion and the other referred to as the top end protrusion, and at least two longitudinal protrusions extending in the vicinity of the wings, the longitudinal and transverse protrusions defining a bearing plane on which a photovoltaic panel can be fixed, and
- a photovoltaic panel fixed to the longitudinal and transverse protrusions, so that a volume of air is formed between the base surface and said photovoltaic panel, the support means having air inlet/outlet means allowing circulation of air in the volume of air.

The invention thus proposes a prefabricated assembly, also referred to as a photovoltaic roof module or element, comprising a support device equipped with a photovoltaic panel. The support device with its longitudinal and transverse protrusions enables a photovoltaic panel to be assembled, without the latter being equipped with a support frame, the panel formed as a plate, for example a glass plate, on which a film of photovoltaic cells is assembled. The photovoltaic panel fixed to the longitudinal and transverse protrusions creates a hollow box having a high moment of inertia that has good resistance to bending and twisting.

According to one embodiment, the photovoltaic panel comprises a film of photovoltaic cells assembled on at least one plate, the photovoltaic panel resting through its plate on the longitudinal protrusions and transverse protrusions, the photovoltaic panel having no support frame for assembly thereof on the support device. According to one embodiment, the photovoltaic panel comprises a film of photovoltaic cells between two plates, for example made from glass, or a film of photovoltaic cells assembled on a single plate.

Advantageously, the assembly comprises a support device as described previously.

Another subject matter of the present invention is a roof that comprises at least one assembly as defined above, said assembly being disposed between two rafters and fixed by two fixing wings of its support device to the rafters.

According to one particularity, the roof comprises at least two assemblies placed in a row alongside each other and at least one overlap piece intended to fit on top of the two adjoining wings of the support devices of the two assemblies mounted on the same rafter.

According to another particularity, the roof comprises at least two assemblies placed in a column between the same two rafters, a first assembly being placed above a second assembly, the bottom end transverse protrusion of the support device of the first assembly overlapping the top rim of the support device of the second assembly.

Other features and advantages of the invention will emerge more clearly from a reading of the following description of a preferential embodiment of the invention, given by way of illustrative and non-limitative example, and the accompanying drawings, among which:

BRIEF DESCRIPTION OF THE DRAWINGS

FIG. 1 is a perspective view of a support device for supporting a photovoltaic panel according to the invention;

FIG. 2 is a transverse sectional view of an assembly formed by assembling a support device according to the invention and a photovoltaic panel;

DETAILED DESCRIPTION OF THE DRAWINGS

Figure 3:
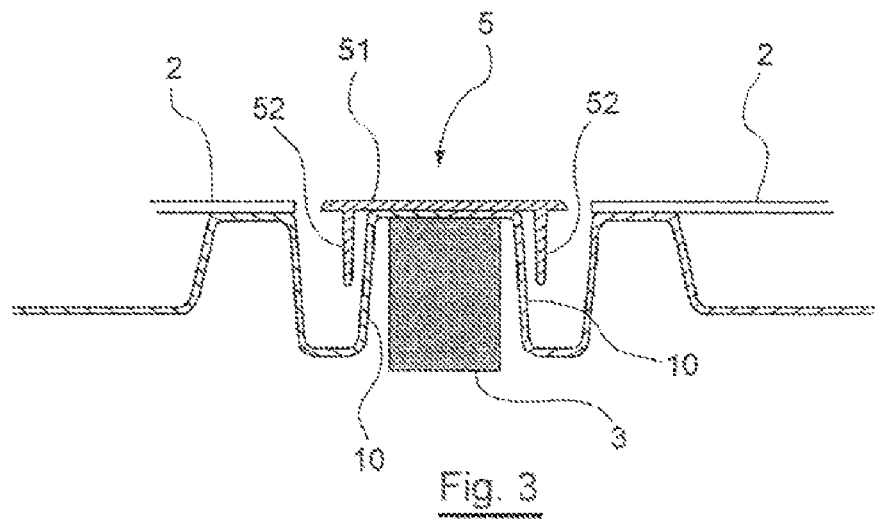
FIG. 3 is a sectional view in section of two adjacent support devices and an overlap piece.

The present invention provides a support device for photovoltaic panels comprising a support for supporting at least one photovoltaic panel designed so that the photovoltaic panel delimits, with a base surface of the support device, a box inside which air can circulate.

FIG. 1 illustrates a support device according to an embodiment of the invention.

As is clear in this Figure, a support device according to the embodiment comprises:
  a base surface 1;
  two fixing wings 10 between which the base surface extends;
  supports 11, 12, 13, 14 on which one or more photovoltaic panels are intended to be attached, these support means extending in elevation with respect to the base surface 1.

It should be noted with reference to FIG. 2 that, the supports extend in elevation with respect to the base surface 1, the photovoltaic panel 2, once attached to the support, is distant from the base surface 1 so that the assembly formed by the support device and the photovoltaic panel constitutes a sort of hollow box delimiting an air volume V between the base surface and the photovoltaic panel.

In addition, according to an embodiment of the invention, the support means are produced so as to form an air inlet/outlet, enabling air to circulate in the volume V.

According to the present embodiment, the support means comprise:
  two longitudinal protrusions 11 extending in the vicinity of the fixing wings 10;
  a top end transverse protrusion 12;
  a bottom end transverse protrusion 13;
  an intermediate transverse protrusion 14, extending substantially halfway between the top end transverse protrusion and the bottom end protrusion.

As is clear, the means enabling air to enter the volume V and/or air to leave therefrom are formed by:
  a reduction 110 in the cross section of the longitudinal protrusions 11, the protrusions 11 extending as far as the top end transverse protrusion 12 and being connected thereto by means of reductions in cross section 110;
  passages 111 in the vicinity of the bottom end transverse protrusion 13, these passages being obtained because of the separated position of the bottom ends of the longitudinal protrusions with respect to the bottom end transverse protrusion.

The formation of these air passages at the connection of the longitudinal protrusions and transverse protrusions makes it possible to keep, for the assembly of the photovoltaic panel, a maximum span on the transverse protrusions.

In addition, the intermediate transverse protrusion 14 has a recess 140 delimiting an air passage within the volume 3, enabling air to circulate between the air passages 110 to the air passages 111, or vice versa.

Naturally it will be understood that the top parts of each of the protrusions 11, 12, 13, 14 lie within the same plane (with the exception of the beads explained below) constituting the support surface for the photovoltaic panel 2.

It should be noted that each of the protrusions 11, 12, 13, 14 as well as the top edge 15 all have a base with a width slightly greater than that of their top end, this assisting the removal of the device from the mold.

In addition, the device has at its top end a rim 15 (here distinct from the top end transverse protrusion 12), and, in parallel, the bottom end transverse protrusion carries an overlap wing 131 intended to overlap the top rim 15 of a second support device according to an embodiment of the invention.

According to another embodiment, the bottom end transverse protrusion 13 and the top rim 15 are defined so that the bottom end transverse protrusion is able to fit on the top rim of another support device.

Moreover, each of the protrusions 11, 12, 13 carries a bead, respectively 112, 120, 130, extending longitudinally on the corresponding protrusion.

With reference to FIG. 2, the photovoltaic panel 2 is assembled on the support device by adhesive bonding, a deposit of adhesive 21 being effected on the top part of the protrusions, the beads 112 (and, according to the same principle, the beads 120 and 130 respectively of the protrusions 12 and 13) forming a stop for the adhesive 21. It should be noted that the beads 112, 120 and 130 have a thickness corresponding substantially to the thickness of the adhesive 21 attached to the protrusions.

According to another feature of an embodiment of the invention, the support device is designed so as to have laterally gutters 102 each extending between a longitudinal protrusion and the corresponding fixing wing. It should be noted that the bottom of the gutters 102 extends at a deeper level than the base surface 1, preventing or limiting the risk of flow of water at the base surface.

Figure 5:
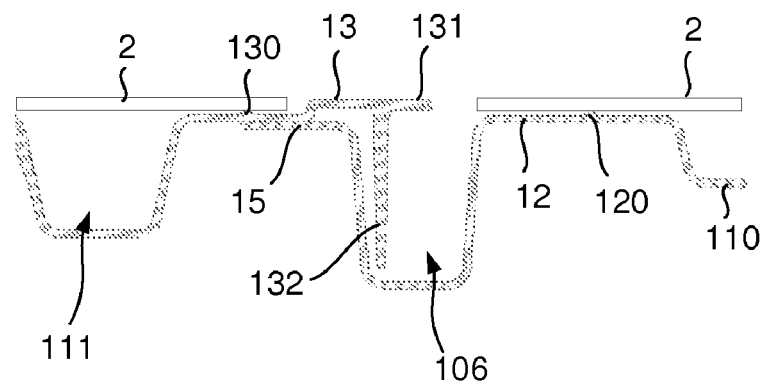
FIG. 5 is a longitudinal sectional view of two adjacent support devices of the same column.

Moreover, with reference to FIGS. 1 and 5, the support device is designed so as to have, between the top end transverse protrusion 12 and the top rim 15, a top transverse gutter 106, said transverse gutter extending from one lateral gutter 102 to the other, and its bottom is disposed substantially at the same level as the bottoms of said lateral gutters.

With reference to FIG. 3, once the support devices according to an embodiment of the invention are fixed alongside each other on the same rafter 3, provision is made for adding an overlap piece 5 finishing and sealing the mounting. As is clear, this overlap piece 5 comprises a flat top part 51 from which there extend two wings 52 separated from each other so that the piece can fit on top of two fixing wings 10 mounted on the same rafter 3.

This piece 5 has a length corresponding to that of the support devices on which it is added and fixed.

According to an embodiment the support device according to the invention as described above consists of a single piece grouping together all the constituent parts (base surface, protrusion, fixing wing, etc) constituting the device. The single piece constituting the support device is produced from a composite material, consisting preferentially of a mixture of glass fibres and polyester resin. The device thus produced is self coloured to the colour of the solar panel and treated so as to procure for it effective resistance to ultraviolet.

By way of indication, a support device according to an embodiment of the invention has width of 700 mm and a length of 1300 mm.

A support device according to the invention can be placed on the rafters of a timber or metal roof frame. The rafters must then be vertical and have conventional dimensions (that is to say a cross section of 50 mm×75 mm). Naturally the spacing between centers of the rafters must absolutely correspond to the width of the support device according to the invention.

The support device according to an embodiment of the invention is installed in the following fashion.

Figure 4:
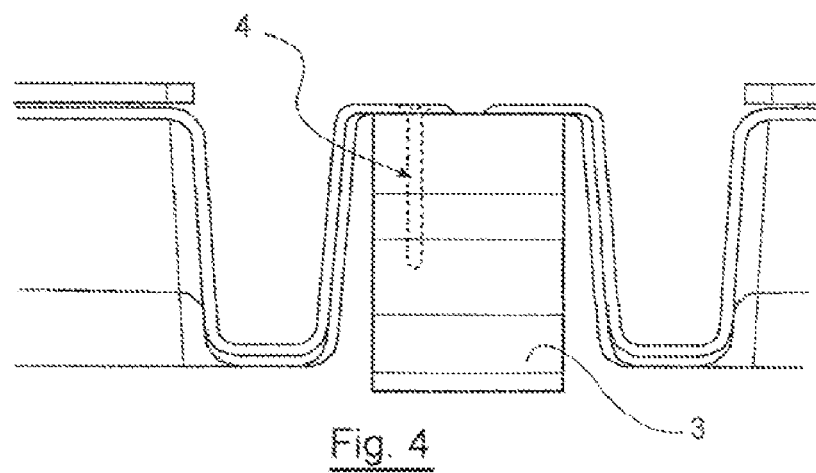
FIG. 4 is a sectional view of an assembly of support devices according to the invention on a rafter of a roof frame.

The installation begins with the fixing of a device at the bottom of the roof, and at the lateral end thereof. Once the panel is positioned, the fixing wings are fixed to the rafters 3, by means of screws 4 (FIG. 4), for example screws with a length of 40 mm, with a countersunk head and made from galvanised steel. The screws are threadably inserted at the holes 101 provided for this purpose on each of the fixing wings 10 (these holes being for example five in number per fixing wing).

The installer next chooses the manner of placing the following panels: either he proceeds in rows or he proceeds in columns (there is no particular order to be complied with).

When it is a case of placing the panels in columns, the positioning of the devices with respect to one another is carried so that the overlap wing 131 carried by the bottom end transverse protrusion 130 of a first device overlaps the top rim 15 of a second device placed below the first device. According to another embodiment illustrated in FIG. 5, placing in columns is carried out so that the bottom end transverse protrusion 13 of the first device overlaps the top rim 15 of a second device placed below the first device, the external vertical wall 132 of the bottom end transverse protrusion being disposed in the transverse gutter 106 of the second device, and the lateral walls 151 of the top rim 15 fitting between the lateral walls 133 of the bottom end transverse protrusion. In this embodiment, the overlap wing 131 partially overlaps the transverse gutter of the second device.

Once all the devices have been installed (or gradually as they are installed), the overlap pieces 5 are installed so as to fit on top of two adjacent fixing wings. Fixing these overlap pieces by screws requires recourse to rubber washers (to ensure that the threadable insertion of the screws is impervious) on each of which a metal washer made from stainless steel is added.

With reference to the Figure, it should be noted that, once the devices are installed and the overlap pieces put in place, overall flatness is obtained, procuring, for an observer, very good aesthetic qualities for the roof thus produced.

The invention claimed is:

1. A support device for supporting at least one photovoltaic panel on a roof, comprising:
a base surface extending between two fixing wings;
support means for supporting said photovoltaic panel or panels extending in elevation with respect to said base surface so as to form a volume of air between said base surface and said photovoltaic panel or panels, said support means having air inlet/outlet means enabling air to circulate in said air volume, said support means comprising
at least two transverse protrusions, one referred to as the bottom end protrusion and the other referred to as the top end protrusion,
at least two longitudinal protrusions extending in the vicinity of said wings, at least one of said longitudinal protrusions being distant from said bottom end transverse protrusion, and
said longitudinal protrusions extending as far as the top end transverse protrusion, at least one of said longitudinal protrusions having a reduction in cross section in the vicinity of said top end transverse protrusion in order to provide an air passage.

2. A support device according to claim 1, wherein the support device consists of a single piece produced from a composite material and grouping together at least said base surface, said wings and said support means.

3. A support device according to claim 2, wherein said device is formed from a mixture of glass fibres and polyester resin.

4. A support device according to claim 1, wherein said support means comprises at least one intermediate transverse protrusion between said bottom end and top end transverse protrusions.

5. A support device according to claim 4, wherein said intermediate transverse protrusion has at least one recess forming an air passage.

6. A support device according to claim 1, wherein said protrusions carry at least one bead extending over the length of said protrusions.

7. A support device according to claim 1, wherein said wings and said longitudinal protrusions forming in pairs a gutter.

8. A support device according to claim 1, further comprising a top rim, said bottom end transverse protrusion being able to come to overlap the top rim of another support device.

9. A support device according to claim 8, wherein said top rim and the top end transverse protrusion forming a transverse gutter emerging on the two gutters formed by said fixing wings and said longitudinal protrusions.

10. An assembly comprising:
a support device for supporting a photovoltaic panel including,
a base surface extending between two fixing wings; and
support means for supporting a photovoltaic panel extending in elevation with respect to said base surface and comprising at least two transverse protrusions, including a bottom end protrusion and a top end protrusion, and at least two longitudinal protrusions extending in the vicinity of said wings, said longitudinal and transverse protrusions defining a bearing surface on which a photovoltaic panel can be fixed, said longitudinal protrusions extending as far as the top end transverse protrusion, at least one of said longitudinal protrusions having a reduction in cross section in the vicinity of said top end transverse protrusion in order to provide an air passage; and a photovoltaic panel fixed to the longitudinal and transverse protrusions, so that a volume of air is formed between said base surface and said photovoltaic panel, said support means having air inlet/outlet enabling air to circulate in said volume of air.

11. An assembly according to claim 10, wherein the photovoltaic panel further comprises a film of photovoltaic cells assembled on at least one plate, the photovoltaic panel resting through its plate on the longitudinal protrusions and transverse protrusions.

12. An assembly according to claim 10, wherein the photovoltaic panel is fixed by adhesive bonding to the longitudinal protrusions and the transverse protrusions.

13. An assembly according to claim 10, wherein at least one of said longitudinal protrusions is distant from said bottom end transverse protrusion.

14. An assembly according to claim 10, wherein said support device comprises a top rim, said bottom end transverse protrusion adapted to overlap the top rim of another support device.

15. A roof, comprising at least one assembly according to claim 10, wherein said assembly is disposed between two rafters and fixed by the two fixing wings of its support device to said rafters.

16. A roof according to claim 15, further comprising at least two assemblies placed alongside each other and at least one overlap piece intended to fit on top of the two adjoining wings of the support devices of the two assemblies mounted on the same rafter.

17. A roof according to claim 15, further comprising at least two assemblies, wherein said support device of each assembly comprises a top rim, said bottom end transverse protrusion adapted to overlap the top rim of another support device, said two assemblies being placed in a column between the same two rafters, a first assembly being placed above a second assembly, the bottom end transverse protrusion of the support device of the first assembly overlapping the top rim of the support device of the second assembly.

* * * * *